United States Patent [19]

Bramwell

[11] 4,293,109
[45] Oct. 6, 1981

[54] PIVOTABLE CABLE GUARD FOR RETAINING A SWINGABLE-MOVABLE CABLE

[75] Inventor: Frank Bramwell, Hamden, Conn.

[73] Assignee: The United States of America as represented by the Secretary of the Navy, Washington, D.C.

[21] Appl. No.: 76,896

[22] Filed: Sep. 19, 1979

[51] Int. Cl.³ ............... B64C 27/04; B64C 27/50
[52] U.S. Cl. ............... 244/17.11; 74/501.5 R; 244/49; 254/411; 474/140; 474/144
[58] Field of Search ............ 244/17.11, 17.17, 17.19, 244/17.21, 46, 49; 474/144, 145, 146, 147, 140; 254/403, 411; 74/501.5

[56] References Cited

U.S. PATENT DOCUMENTS

| | | | |
|---|---|---|---|
| 1,348,240 | 8/1920 | Pieper et al. | 474/140 |
| 3,116,896 | 1/1964 | Sigler et al. | 244/17.11 |
| 3,142,459 | 7/1964 | Baetke | 244/46 |
| 3,901,464 | 8/1975 | Arnstein et al. | 244/46 |
| 3,921,938 | 11/1975 | Jupe et al. | 244/17.11 |

Primary Examiner—Charles E. Frankfort
Attorney, Agent, or Firm—Richard S. Sciascia; Thomas M. Phillips

[57] ABSTRACT

The guard retains the cable on a pulley of a cable control system that includes another pulley mounted on a pivotable radius arm for swingable movement relative to it. Usually, the swingable pulley is linked to a third pulley mounted on a hinged structural member which itself swings with the radius arm to and from 'closed' or 'open' positions. When the arc is wide, i.e. around 180°, conventionally mounted guards engage and bind the swinging cable. The present guard is an elongate member pivotally mounted on the radius arm. In the 'closed' position, a retaining flange formed on the guard moves for cable retaining purposes into close proximity with the fixed pulley and the proximity or clearance can be adjustably fixed and locked by an eccentric stop. During the 'opening' swing, the cable engages the guard which then pivots sufficiently to prevent the undesired binding. The pivotal range of the guard is restricted by a pin and slot arrangement.

6 Claims, 7 Drawing Figures

4,293,109

PIVOTABLE CABLE GUARD FOR RETAINING A SWINGABLE-MOVABLE CABLE

BACKGROUND OF THE INVENTION

The present invention, relates to Pat. application, Ser. No. 12,548 filed Feb. 15, 1979, "Tail Rotor Control Cable Pylon Fold Accomodation", now U.S. Pat. No. 4,245,801, relates to cable guards for holding a cable in contact with a pulley.

The system described in the referenced application is concerned primarily with a particular type of helicopter in which a tail rotor pylon is foldable about a vertical hinge from a 'closed' or flight position to an 'open' or folded position in which it lies alongside the tail cone. In the closed position, the pylon forms an axial extension of the tail cone. The folding capability permits storage of the helicopter in a shipboard hangar or its handling in a ship elevator.

The invention, as described in that application, involves a system of pulleys and links capable of maintaining a constant tension in a rotor blade control cable during the folding and unfolding. Such a cable, as is known, usually extends from the pilot's compartment aft across the hinged connection of the pylon to the tail cone where it connects with the rotor blades to control their pitch during flight. Preferably, the connection is maintained during the folding operations. Consequently, the pulley and link system must be arranged to accomodate the hinged swing while maintaining cable tension. In general, the system includes a fixed tail cone pulley, a fixed tail rotor pulley and a floating pulley linked to the tail rotor pulley and carried at the free end of a radius arm which, itself, is pivotally mounted on the tail cone. The cable passes over these pulleys and swings with the floating pulley during folding.

The cable guard of the present invention primarily is intended for use with the pulley and link system of such a foldable helicopter. It is, however, adaptable for use with other pulley systems provided, of course, the other systems present comparable problems. In particular, difficulties have been experienced in providing the desired cable guarding or retaining capability for the cable wound on the fixed tail cone pulley of the system. Since the cable wound on this pulley swings away from the pulley during the folding operation, guard members cannot be mounted in a fixed position since they then would be in the path of the swinging cable and block the swing. To avoid this problem, it is possible to mount the guard on the radius arm so as to permit it to swing with the arm into and out of its cable guarding disposition. However, this solution presents its own difficulties. Thus, as experience has shown, when the arc of the swing is sufficiently wide, the guard still lies in the path of the swinging cable so that, to complete the swing, the cable must bend around the guard rather than swing in a straight line path. This bending or kinking rather quickly weakens the cable and promotes breakage due to premature fatigue.

It is therefore an object of the present invention to provide a cable guard capable of providing the desired cable retention without interfering with the cable during its swinging movement. As will be described, this object generally is achieved by mounting a particular guard member pivotally on the radius arm. The pivotal mounting permits the guard to yield to the cable contact.

A related object is to provide an arrangement which, regardless of its pivotal character, can be firmly set and locked in a precise position for achieving its primary cable guard function.

DESCRIPTION OF THE DRAWINGS

The invention is illustrated in the accompanying drawings of which.

DETAILED DESCRIPTION OF THE INVENTION

As has been noted, the present invention is directed toward a cable guard adapted especially for use with pulley and linkage system described in the referenced patent application. For present purposes, that system will be described primarily to illustrate the operation of the present guard as well as its structure and its mounting. As noted, use of the guard in other pulley systems is contemplated.

Figure 1:
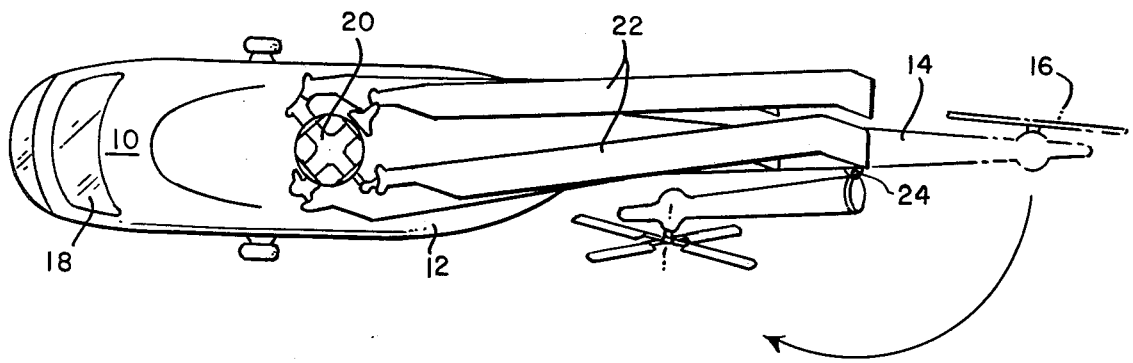
FIG. 1 and 2 are plan and side views, respectively, of a particular helicopter in which the present cable guard is used.
Figure 2:
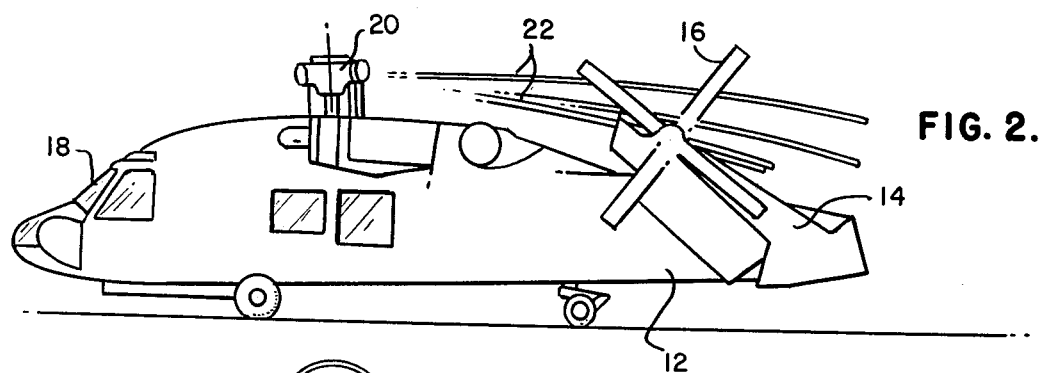

Referring first to FIGS. 1 and 2, a helicopter is shown having a fuselage 10 terminating in an aft tail cone 12 and tail rotor pylon 14 which supports a tail rotor 16. The usual pilot's compartment 18 is provided near the forward end of the fuselage. A main rotor head 20 has four blades 22 which are foldable as shown back over the fuselage. Tail rotor pylon 14 which is an extension of the tapered tail cone 12 is mounted on a vertical hinge pin 24 on the end of the tail cone for folding movement into its illustrated position in which it lies alongside tail cone 12. In the folded disposition shown in FIG. 2, the helicopter can be stored in a shipboard hangar or transported in a carrier elevator for storage below deck.

The blade pitch of tail rotor 16 is controlled by the pilot by means of cables carried by a special cable pulley and linkage system provided at the junction between the tail cone and the tail rotor pylon. Functionally, the system maintains a substantially constant cable tension during the folding and unfolding movements of the pylon.

Figure 3:
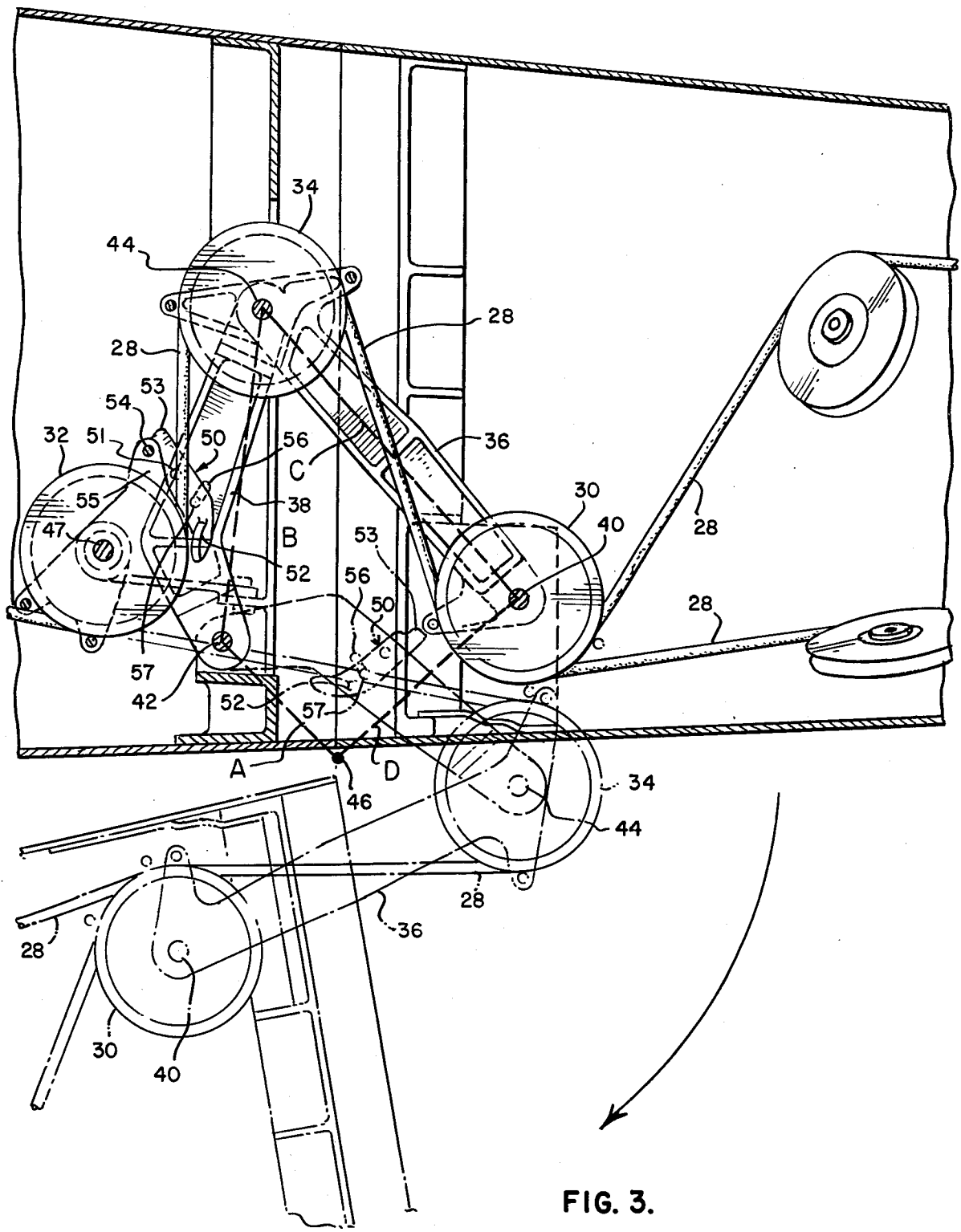
FIG. 3 is a somewhat schematic plan view, partly in section, of a particular pulley and linkage system used in the helicopter of FIGS. 1 and 2 showing the manner in which the present cable guard is applied to it.

Referring to FIG. 3, the system includes a control cable 28 wound on a pulley 30 fixed to pylon 14 as well as a pulley 32 fixed to tail cone 12 and a free-floating pulley 34. The preferred form uses a dual control cable arrangement having two cables and duplicate pulleys and linkages. Because of the duplicity, description can be limited to only one. All three pulleys 30, 32 and 34 are small and of the same diameter. Free-floating pulley 34 is supported by two links 36 and 38 of different length. The longer link 36 is pivoted on pylon 14 at 40 which is also the pivot for pulley 30. The shorter link 38 is pivoted at one end on the tail cone at 42. This link, as will become apparent, is a critical functional component of the present cable guard. Consequently, to distinguish it from link 36, it will be referred to as a radius arm in that it defines the swing of floating pulley 34 and the cable which it carries. Link 36 and radius arm 38 have their free ends pivotally connected by pivot pin 44 which is also the pivot for floating pulley 34. As indicated on the drawings in dash lines, link 36 and radius arm 38 together with the tail cone and pylon provide a 4-bar linkage forming a quadrilateral figure having sides A, B, C and D no two of which are parallel. Side A consists of the portion of the tail cone 12 between fold hinge line 46 and pin 42; side B consists of radius arm 38; side C consists of link 36; and side D consists of the portion of tail rotor pylon 14 between pin 40 and fold hinge line 46. Side A is sometimes referred to as the "ground bar" since it is the part of the basic structure which does not move relative to the other bars. With regard to the arrangement it should be noted that pulley 32 is not mounted on pin 42 at the end of radius bar 38, but instead is critically located on a pin 47 spaced well forward of pin 42 on tail cone 12. Also it can be noted that radius arm 38 between pivots 42 and 44 is shorter than link 36 between pivots 40 and 44 and that side D of the quadrilateral figure is longer than side A.

The operation of this system of linkage and pulleys should be apparent from the foregoing description although further details are provided in the referenced patent application. In general, as there noted, it achieves a unique capability of permitting the tail rotor pylon to be folded through an angle of about 180° while maintaining substantially constant tension on the cable and, importantly, it can achieve this capability within a relatively small envelope circle of about 14". The improvements primarily result from the use of links of different lengths in combination with small pulleys all of one size and, further, from the fact that pulley 32 is fixed on tail cone 12 at a position spaced forward of pivotal axis 42 of the radius arm.

Figure 6:
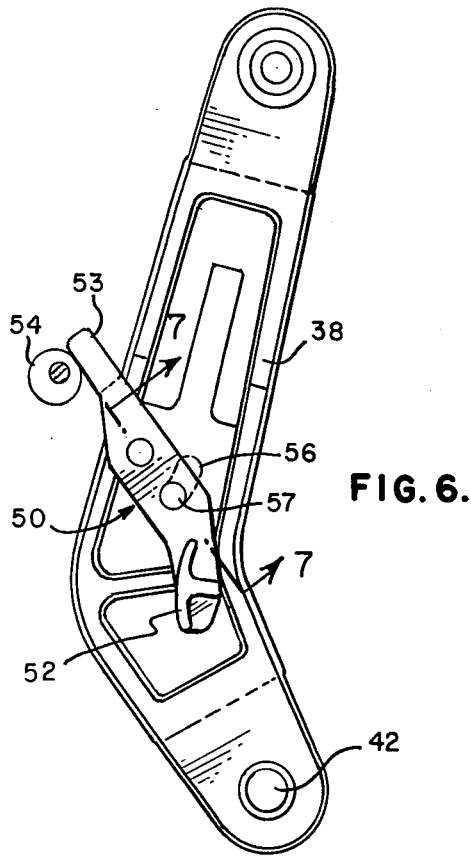
FIG. 6 is an enlarged view showing the present cable guard mounted on the radius arm of the FIG. 3 system.

The principal feature of the present invention is the provision of a particular cable guard member 50. As shown in FIGS. 3 and 6, this guard is an elongate member extending generally lengthwise of the medial portion of radius bar or link 38 to which it is pivotally or rockably secured by a pin 51. A cable retaining flange 52 is formed at one of its ends which, as will be noted in FIG. 3, is the end closest to pivotal axis 42 of the radius bar. The other end is reduced to provide an abutment flange 53 adapted to engage an eccentric shaft 54 supported on a bifurcated bracket 55 which carries pulley 32. As also shown, a pin and slot arrangement is provided to limit the pivotal range of the guard member relative to the radius bar. In particular, the radius bar is provided with an arcuate slot 56 in which a pin 57 carried by the guard rides. Obviously, the pivotal movement of the guard is restricted by the length of the slot and the slot is curved arcuately to avoid binding. The particular functions of these various components will be clarified in subsequent description.

Figure 7:
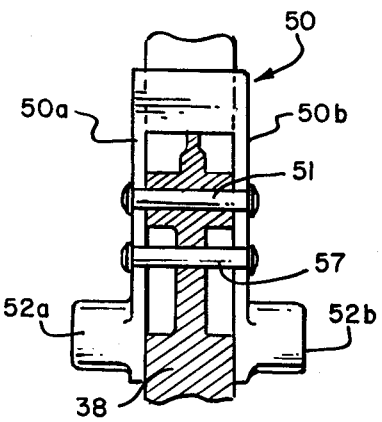
FIG. 7 is a section taken along line 7—7 of FIG. 6.
Figure 4:
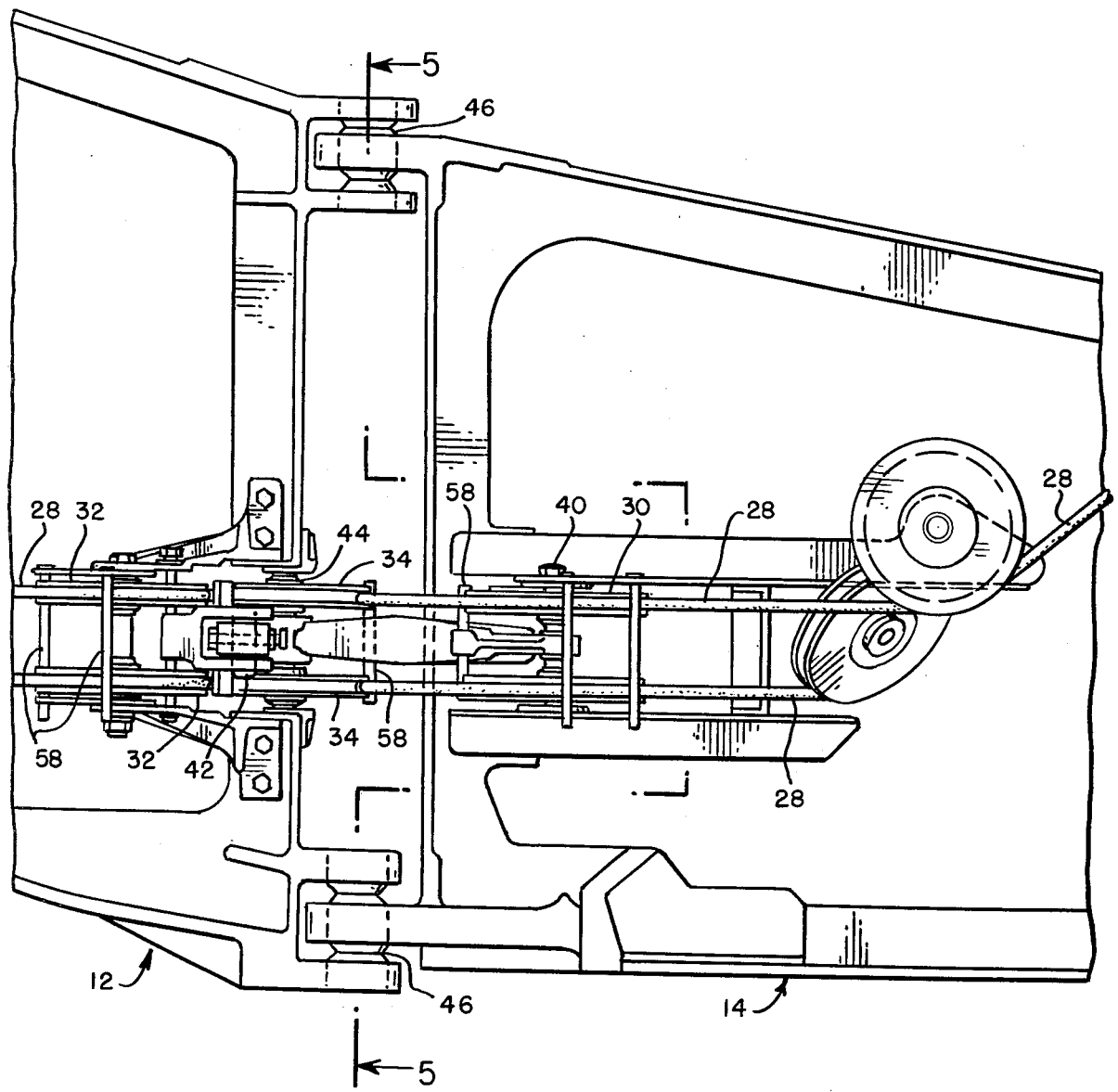
FIG. 4 is a side view of FIG. 3 partially in cross section.
Figure 5:
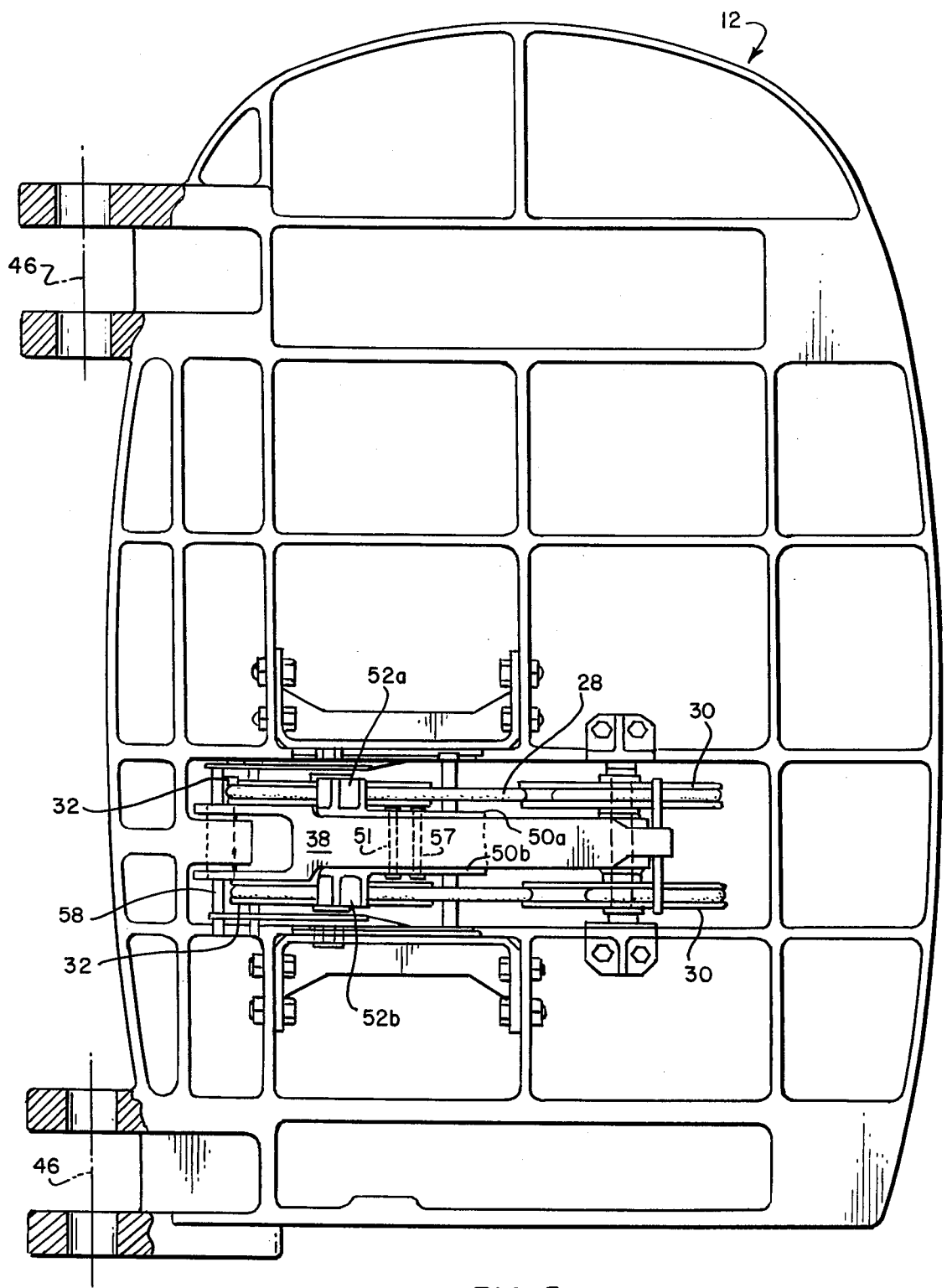
FIG. 5 is a vertical cross section through the helicopter pylon at its hinge line and substantially along line 5—5 of FIG. 4.

FIGS. 4 and 5 show other features of the guard member which adapt it for use in the dual cable arrangement already described. In particular, as shown in FIG. 5, the guard includes a pair of plates 50a and 50b mounted one on each side of the radius bar with pins 51 and 57 extending through the bar in the manner shown in FIG. 7. Instead of a single retaining flange, the dual cable arrangement requires the formation on each of the plates of a retaining flange 52a and 52b each of which extends transversely over the cable wound on pulley 32. This dual aspect primarily is a matter of design to accomodate the particular dual cable which, as already noted, controls the rotor blades of the illustrated helicopter. Other functionally similar arrangements can be substituted as desired.

To provide a clearer understanding of the operation of the present cable guard, it first can be noted in FIGS. 3, 4 and 5 that another fixed pin type of cable guard 58 is employed at various locations to hold or retain the wound cable. Thus, fixed pins 58 are provided at appropriate locations on pulleys 30, 32 and 34. These fixed pins represent conventional mechanisms which, as used, adequately serve their intended purpose. However, since they are fixed to or carried by the pulley, they cannot be used in place of the present cable guard. Obviously, they would block the swinging movement of the cable away from the fixed pulley when the pylon is swung open. For example, when the pylon swings, the linkage carries pulley 34 to its dot-and-dash line position and, as shown in FIG. 3, the cable itself is carried from its solid line position to its dot-and-dash line position.

A possible alternative is to mount the fixed pin cable guard on radius arm 38 so that the pin then will move away from pulley 32 with the radius arm. Such an alternative, however, is not acceptable since, when the swing of the pylon or other structural member, is sufficiently wide, the swinging cable guard would engage the cable and produce a bind or kink which causes cable failure due to premature fatigue damage. If a conventional fixed pin, similar to the other pins 58, is mounted on radius arm 38 in a position in which it has the desired clearance needed to effectively retain the cable on pulley 32 during the closed disposition of the arrangement, it still lies in the path of the swinging cable during the final arc of its swing. In other words, during about the final 30° of the cable swing, it would engage the cable and produce a damaging kink.

This problem presently is solved by the pivotal mounting of cable guard 50. Thus, by comparing the solid line and the dot-and-dash positions, it will be seen that guard 50 pivots or rocks sufficiently to avoid the kink and permit the cable run between pulley 32 and 34 to be a straight line. The pivotal range of the guard is fixed by the pin and slot arrangement so that, preferably, retaining flange maintains an unpressured contact with the cable at the end of its opening swing.

Although the pivotal mounting of guard 50 resolves the cable interference problem, it adds another problem of orienting retaining flange 52 precisely relative to the cable on pulley 32 for its principal purpose of retaining the cable on that pulley. The pivotal or feeely rocking action of the guard is a complicating factor in fixing the desired clearance of the flange from the cable. In the present arrangement, the clearance can be set and the set position then can be locked by the engagement of abutment flange 53 with eccentric 54 which, as shown in FIG. 6, is shaped in such a manner that rotational adjustments will vary the engaged dispositions and cause retaining flange to lock into a set clearance. Also, when the abutment flange is engaged, the guard is locked firmly against accidental or vibrational displacement. Again, the pivotal range of the guard as provided by arcuate slot 56 is sufficient to accomodate the clearance setting. Preferably, as shown, these purposes are served by disposing the pivotal axis of the guard (pin 51)

near the abutment flange and the pin and slot connection between pin 51 and the retaining flange.

In summary, a pivotal cable guard shaped and positioned in the described manner completely avoids the kinking of the cable as it swings in its arc away from its pulley. At the same time, the arrangement including the eccentric stop and the limited pivotal movement permits the guard to be precisely positioned for effective retention of the cable. Although the guard is especially adapted for the wide-arc hinged swing of the helicopter pylon, it also should be found useful in any comparable arrangement in which the swing of the members is such as to dispose a conventional guard in an interfering position in the arcuate path of the cable.

Obviously many modifications and variations of the present invention are possible in the light of the above teachings. It is therefore to be understood that within the scope of the appended claims the invention may be practiced otherwise than as specifically described.

I claim:

1. Cable retaining apparatus for use in a system utilizing a tensioned cable passed around at least a pair of pulleys one of which is arcuately swingable relative to the other between open and closed positions comprising:

an elongate radius arm mounted at one end on a pivotal axis and carrying at its other end an arcuately swingable pulley, an elongate cable guard member having a cable-retaining flange at one of its ends and an abutment flange at the other, said member extending lengthwise of said radius arm and being pivotally mounted medially of its ends on said arm with its retaining flange end closest to said pivotal axis of the arm; said arm and its guard member being so disposed that said retaining flange is carried into close proximity with the cable on the other of said pair of pulleys when said swingable pulley is in its closed position, a stop means for engaging said abutment flange in said closed position and pivotally fixing said retaining flange proximity, and means for limiting the range of the pivotal movement of said retaining flange relative to said arm, said guard member disposition further being such that its retaining flange engages said cable as it moves from said closed to said open position and said pivotal range being such that the retaining flange can pivot responsively to said engagement an amount sufficient to relieve the engagement pressure and prevent undue cable bending.

2. The apparatus of claim 1 wherein said stop means is adjustable to control said proximity, said limited pivotal range of said guard member accomodating said ajustment.

3. The apparatus of claim 2 wherein said stop means is an eccentric member carried by said relatively fixed pulley.

4. The apparatus of claim 2 wherein said means for limiting the pivotal range of said guard member includes:

a pin carried by said cable guard member between its pivotal axis on said radius arm and said retaining flange, said radius arm being formed with an arcuate slot receiving said pin.

5. The apparatus of claim 4 in which said pin engages an end of said slot when said swingable pulley is in its fully open disposition, said engagement permitting said retaining flange to maintain its cable contact without exerting said bending pressure.

6. The apparatus of claim 1 wherein said system is adapted for use on a helicopter in conjunction with a tail rotor pylon that is swingable on a vertical hinge from a closed flight position in which it forms an axial extension of a tail cone to an unfolded position in which it is swung open about said vertical hinge approximately 180°, the other of said pair of pulleys being mounted on said tail cone forward of the pivotal axis of said radius arm and said swingable pulley being linked to a third pulley carried by said pylon.

* * * * *